Figure 1:
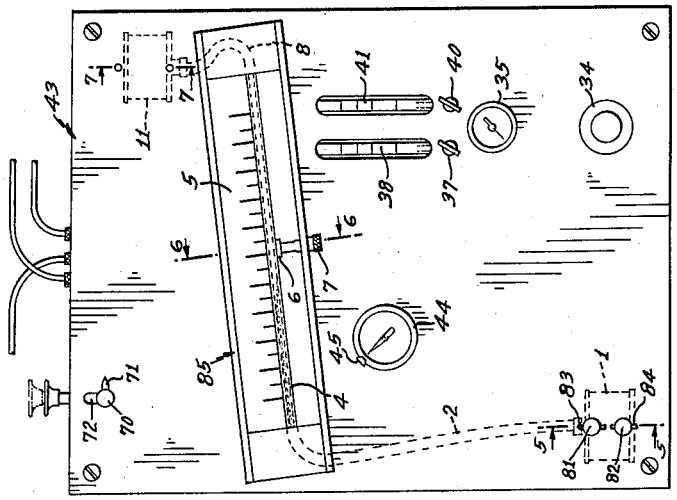

Aug. 11, 1959

J. A. JAWETT 2,898,763

SPECIFIC GRAVITY INDICATORS

Filed Sept. 14, 1956

3 Sheets-Sheet 1

INVENTOR.
Joseph A. Jawett
BY
ATTORNEYS

Aug. 11, 1959  J. A. JAWETT  2,898,763
SPECIFIC GRAVITY INDICATORS
Filed Sept. 14, 1956  3 Sheets-Sheet 2

INVENTOR.
Joseph A. Jawett
BY Edwin Lensol &
Harry Cole
ATTORNEYS

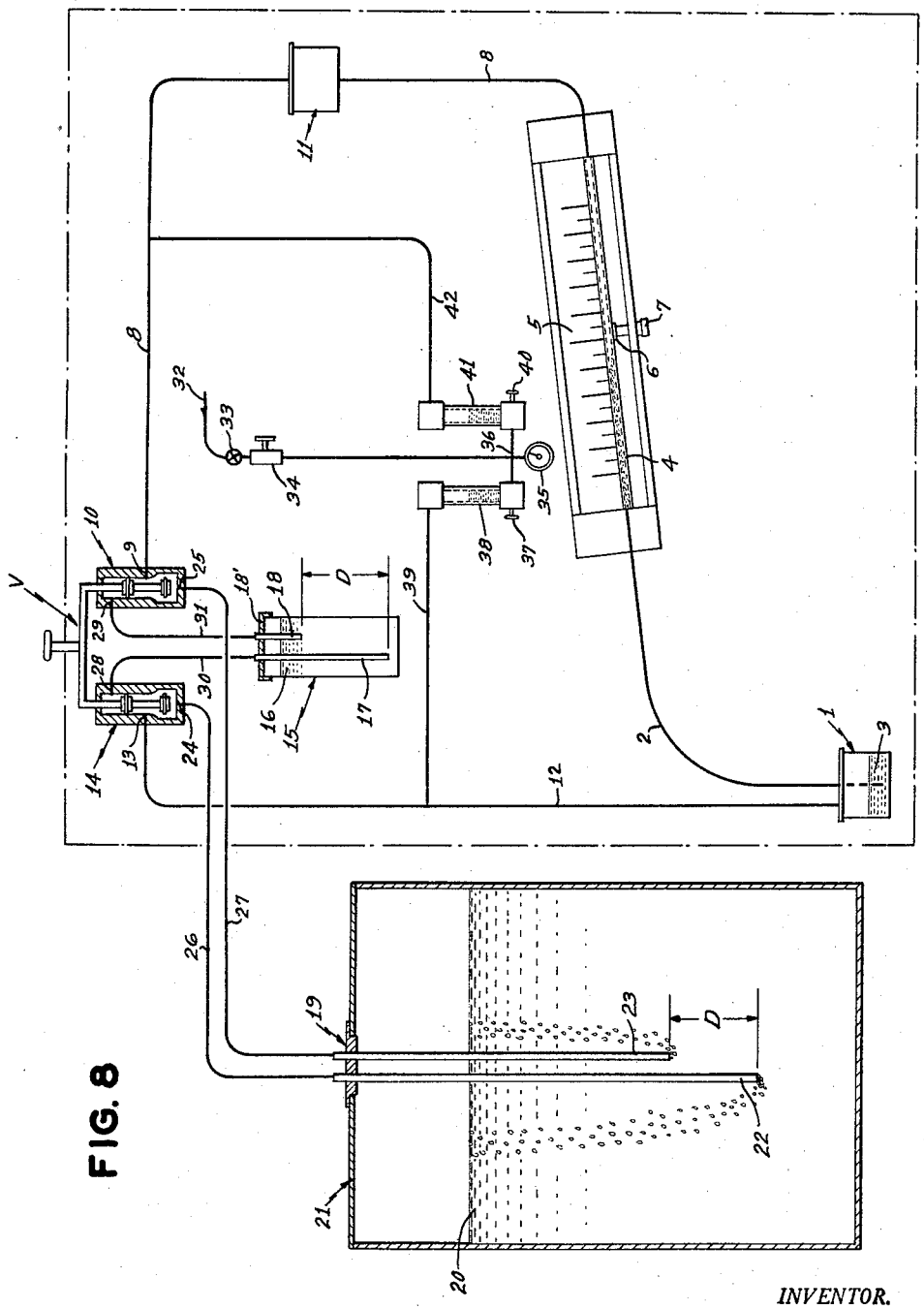

United States Patent Office 2,898,763
Patented Aug. 11, 1959

2,898,763
SPECIFIC GRAVITY INDICATORS

Joseph A. Jawett, Flushing, N.Y., assignor to Petrometer Corporation, Long Island City, N.Y., a corporation of New York Application September 14, 1956, Serial No. 609,856

5 Claims. (Cl. 73—439)

This invention relates to specific gravity indicators, and relates more particularly to an improved specific gravity indicator for liquids.

A feature of the specific gravity indicator of the present invention is the provision of means for producing amplified readings of the specific gravity of liquids being measured on a suitably calibrated scale. This amplified reading is obtained by combining a vertical well-type manometer with an inclined well-type manometer in an unique manner. Thus, by modifying a vertical well-type manometer by adding to the normal indicating leg thereof a leg inclined at a predetermined angle from the vertical, the inclined leg becomes the indicating leg in which is received the indicating liquid employed in the system. Since the indicating liquid will move a greater linear distance in the inclined leg than it would in the vertical indicating leg, the reading obtained is amplified. For example, where the rise of the indicating liquid in an ordinary vertical well-type is Y inches, and the indicating leg is inclined $m$ degrees from the vertical the linear movevement of the indicating liquid, or Z inches, may be determined trigonometrically as follows:

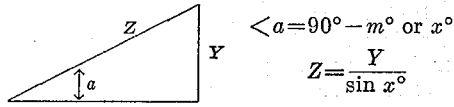

$$<a = 90° - m° \text{ or } x°$$
$$Z = \frac{Y}{\sin x°}$$

From the foregoing, it will be seen that the value of Z in inches will be substantially greater than the value of Y in inches.

Other features of my invention will appear from the following detailed description and claims.

Figure 2:
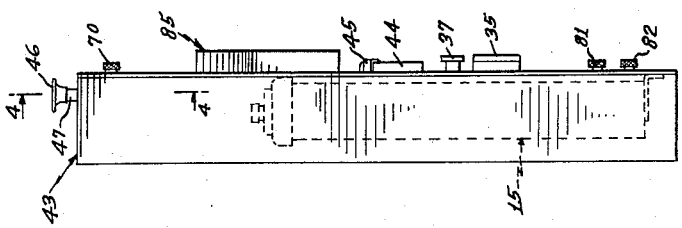
Figure 3:
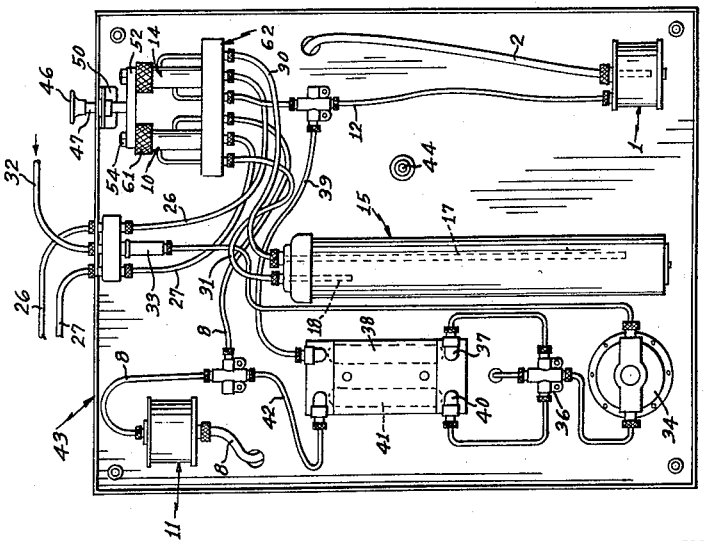
Figure 4:
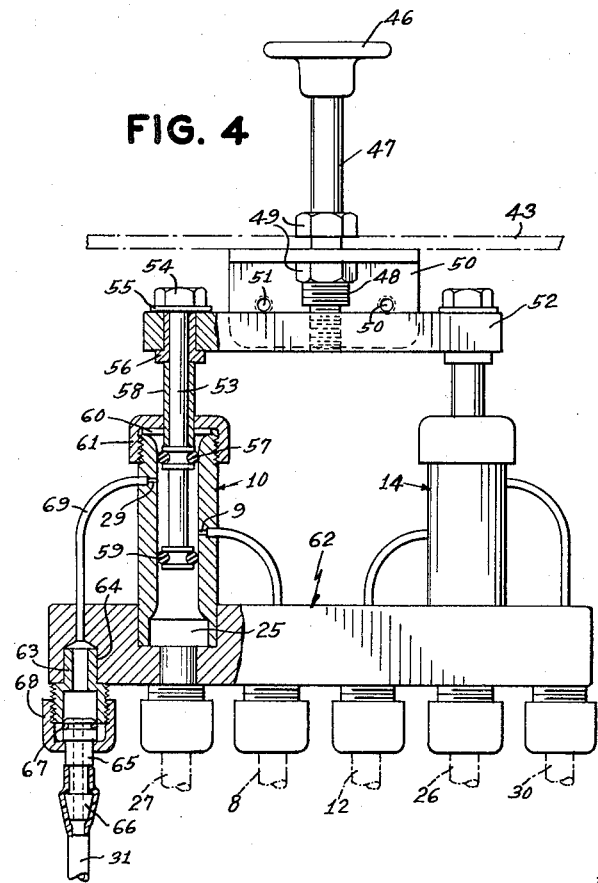
Figure 6:
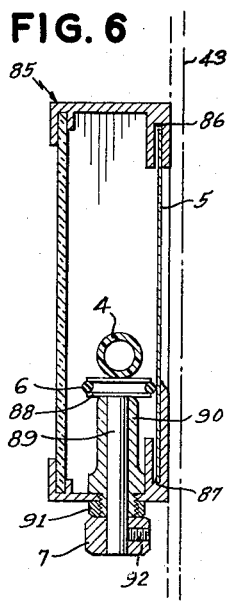
Figure 7:
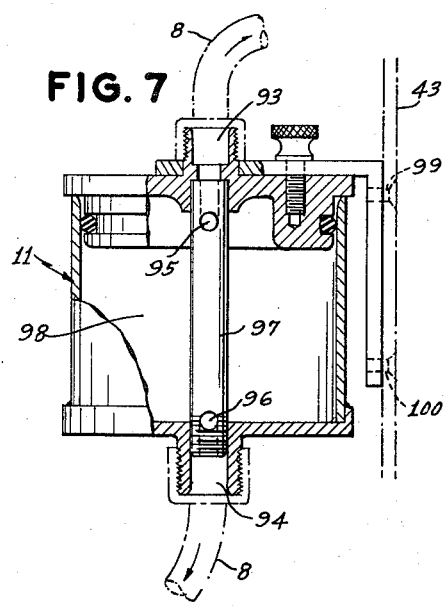
Figure 5:
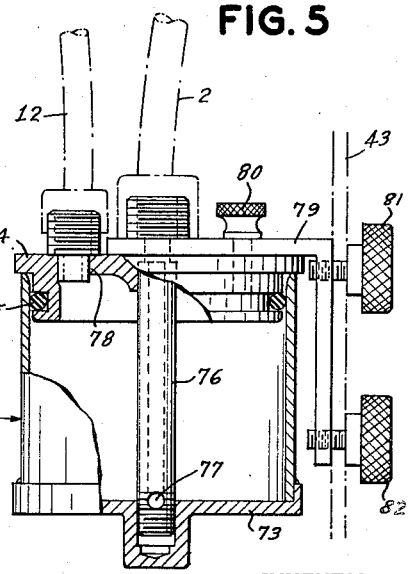

In the drawings wherein a preferred embodiment of my invention is shown:

Fig. 1 is a front elevational view of a panel on which is mounted certain operating elements and registering elements of the specific gravity indicating device of my invention, Fig. 2 is a side elevational view of the panel shown in Fig. 1, Fig. 3 is a rear view of the panel shown in Fig. 1, Fig. 4 is an enlarged view, partly in section, taken along line 4—4 of Fig. 2, Fig. 5 is an enlarged view, partly in section, taken along line 5—5 of Fig. 1, Fig. 6 is a cross-sectional view, on an enlarged scale, taken along line 6—6 of Fig. 1, Fig. 7 is an enlarged view, partly in section, taken along line 7—7 of Fig. 1, and Fig. 8 is a schematic view of the apparatus of my invention shown in detail in Figs. 1 to 7.

Referring now to the drawings and particularly Fig. 8, there is shown a U-tube pressure gauge in which a well 1 constitutes the pressure leg and tube 2 constitutes the indicating leg. The indicating leg 2 is adapted to dip into the body of indicating fluid 3 in well 1, which fluid may be any suitable fluid of known specific gravity having stable properties, preferably colored. The indicating leg or tube 2 has a transparent section 4 which is inclined to provide for greater sensitivity and accuracy in the reading of the height of the indicating liquid in the indicating leg 2. The inclined section 4 is mounted over a calibrated scale 5 which is adjustable along the longitudinal axis of the inclined section 4 by means of a roller 6 in frictional contact with said scale 5, which roller is operated by knob 7.

Connected to the upper end of the inclined section 4 of the indicating leg of the U-tube is a transmission line 8, hereinafter referred to as the upper transmission line. The upper transmission line is connected to the middle port 9 of a valve 10 of a unitary-controlled dual or twin 3-port, 2-position, push-button type valve assembly, generally indicated by reference character V. The upper transmission line 8 has intermediate its length an overflow reservoir 11 functioning as an emergency trap to catch indicating liquid rising in said line, thereby preventing movement of indicating liquid into valve 10. Transmssion line 12, hereinafter referred to as the lower transmission line, connects the well 1 with the middle port 13 of the second valve 14 of the dual valve assembly V.

A tank 15 filled with a standard liquid 16 of known specific gravity, which is preferably a neutral, stable gauge oil, such as colorless and odorless kerosene having a specific gravity of 0.785, is provided with a lower probe tube 17 and an upper probe tube 18, both held in fixed relation to each other in the cover 18' of the tank 15. Thus, the probe tubes are of such length and are so held in tank 15 that the lower end of probe tube 18 is at a fixed height D, e.g. 10 inches, above the lower end of probe tube 17. The probe tubes 17 and 18 are operatively connected, through dual valve assembly V in a manner hereinafter described, to a measuring probe assembly 19 which is adapted to be inserted into a liquid 20, the specific gravity of which is to be measured, contained in tank 21. The probe assembly 19 comprises a lower probe tube 22 and an upper probe tube 23 with the lower end of probe tube 23 being at the distance D above the lower end of probe tube 22, i.e the same distance as obtains between the lower ends of probe tubes 17 and 18.

In Fig. 8 the dual valve assembly V is shown with the valve stems in their lower positions whereby lower transmission line 12 and upper transmission line 8 are simultaneously connected to, respectively, probe tube 22 through ports 13 and 24 of valve 14, and probe tube 23 through ports 9 and 25 of valve 10. Port 24 is directly connected to probe tube 22 by means of a line 26, and port 25 is directly connected to probe tube 23 by means of a line 27. As is shown in Fig. 4, the valve stems of the valves 10 and 14 are in their upper position in which case the upper transmission line 12 and the lower transmission line 8 are connected to, respectively, probe tube 17 through ports 13 and 28 of valve 14 and probe tube 18 through ports 9 and 29 of valve 10. Port 28 is directly connected to probe tube 17 through line 30, and port 29 is directly connected to probe tube 18 through line 31. Compressed inert gas, e.g. air at 60 p.s.i., is introduced into the system from a suitable supply through line 32. The system must be airtight and air at the proper gauge pressure must be maintained in the system in order that it may function properly. To maintain the air in the system at the desired pressure and to prevent siphoning effects in the case of failure of the compressed air supply there is provided in line 32 a check valve 33. In line 32, there are also provided a regulator valve 34 to reduce the air pressure in the system to the desired value, e.g. to 10 to 20 p.s.i. gauge, a pressure gauge 35 and header 36. Operatively connected to header 36 are a needle valve 37 and flowmeter 38 which enable the compressed air to be delivered to the lower transmission line 12 through tube 39. Similarly, needle valve 40 and flowmeter 41 are employed to enable delivery of compressed air from header 36 to upper transmission line 8 through tube 42. The rate of delivery of compressed air to the transmission lines 8 and 12 should be such that a steady flow of bubbles from the lower or open ends of all probe tubes is maintained.

Referring now to Figs. 1 to 3, there is shown a practical embodiment of my invention which is shown schematically in Fig. 8. Thus, on panel 43 are mounted the elements of the apparatus of my invention with all indicator and control elements visible or accessible on the front of panel 43 and the other, or operating elements, suitably attached to the rear face of said panel and connected to the indicator and control elements through suitable holes in said panel. Transparent plastic tubing, preferably of polyethylene although other polymeric tubing may be employed, is used for all transmission lines. However, the tubes conducting the compressed air into the system are preferably copper tubes equipped with double compression fittings for attaching said copper tubes to needle valves 37 and 40 in an air-tight manner. The panel board is also provided with a thermometer 44 equipped with a memo pointer 45 whereby the ambient temperature of the panel may be observed and recorded, any considerable temperature change (e.g. 10° F.) requiring resetting of the calibrated scale 5.

Fig. 4 shows the construction of the dual 3-port, 2-position push-button type valve assembly V including valves 10 and 14. Both valves are simultaneously actuated by means of valve handle 46 mounted on guide rod 47 riding in bushing 48. Lock nut 49 holds bushing 48 and the entire valve assembly firmly in bracket 50 which is fastened to panel board 43 by screws 51. Guide rod 47 is attached to the valve assembly by threading the same into a tie bar 52. Valve stem 53 of valve 10 is fastened to tie bar 52 by nut 54, washer 55 and bushing 56. Sealing O-ring and its holder, indicated by reference numeral 57, on valve 53 is held in spaced relation to bushing 56 by spaced tube 58. Sealing O-ring and its holder 59 are fastened to the bottom of valve stem 53 and the upper end of valve 10 is sealed by means of retainer washer 60 and retainer nut 61. The bottom of valve 10 is fastened to valve terminal block 62 which is bored and equipped with suitable fittings to receive transmission lines 31, 27, 26 and 30 from the probe tubes, upper transmission line 8 from overflow reservoir 11 and lower transmission line 12 from well 1. Thus, bushing 63 in bore 64 receives tube 65 provided at its lower end with nipple connection 66 over which is fitted line 31 to the upper probe tube 18 in tank 15. The tube 65 is sealed in the terminal block 62 by means of sealing O-ring 67 and retainer nut 68. Bore 64 is connected to port 29 in valve 10 by jumper tube 69. Similar connections are provided to the other ports in the valves. Handle 46 is provided with a lateral extension 70 on which is mounted a pointer 71 to indicate the position of the valves. Lateral extension 70 passes to the front of the panel board through slot 72. It will be seen that in the upper position of the valve handle 46, as shown in Fig. 4, upper transmission line 8 from the overflow reservoir 11 is connected to transmission line 31 to the upper probe tube 18 in tank 15 through ports 9 and 29 in valve 10. In the lower position, as shown in Fig. 8, line 8 is connected to line 27 to the upper probe tube 23 inserted in liquid 20 to be measured through ports 9 and 25 of valve 10. Valve 14 is mounted in the dual valve assembly in a manner similar to that of valve 10 and similarly controls communication of lower transmission line 12 to transmission line 30 in the upper position and to transmission line 26 in the lower position.

Feferring to Fig. 5, the well 1 is shown as including a flanged bottom 73 and a well cap 74 sealed by sealing O-ring 75. Leg 2 of the indicating column of the U-tube pressure gauge communicates with tube 76 which extends to the bottom of the well and contains a lateral opening 77 at the bottom. Lower transmission line 12 opens into the top of well 1 through bore 78 in the well cap 74. The well is fastened to an adjustable well bracket 79 with a fastener screw 80. Adjustment screws 81 and 82 threaded in bracket 79 pass through slots 83 and 84 in the panel 43 permitting a vertical adjustment (e.g. about 2″) of the well 1 for optimum positioning of the height of the indicating liquid 3 in the inclined section 4 of the indicating leg of the U-tube pressure gauge. The connections between indicating leg 2 and lower transmission line 12 and the interior of the well are provided with the usual bushings and retainer nuts to maintain a gas-tight and liquid-tight seal.

Fig. 6 shows the construction of the indicating unit 85 containing inclined section 4 of the indicating leg. Calibrated scale 5 of suitable material, which may be plasticized parchment-type paper suitable for typing or drafting of numerals, segments, etc., is movably mounted in slots 86 and 87 at the back of the indicating unit. Friction roller 6 resting on scale 5 is mounted on wheel 88 joined to shaft 89 which passes through the lower side of the indicating unit through bushing 90 fastened in place by a nut 91. Adjusting knob 7 is fastened to shaft 89 by means of a set screw 92. Rotation of knob 7 rotates friction roller 6 on wheel 88, which thus slides scale 5 in slots 86 and 87 to permit zero adjustment when testing with a standard liquid in tank 15.

Fig. 7 shows the construction of the overflow reservoir 11 as being substantially the same as that of well 1 except that it has only one opening 93 in the cover and an opening 94 in the bottom for connection to and interposition in line 8. Lateral openings 95 and 96 at the top and bottom of tube 97 between openings 93 and 94 allow access of any indicating liquid rising in line 8 to the overflow chamber 98. The reservoir is affixed to the panel 43 by screws 99 and 100.

In operation of my specific gravity indicator, a supply of compressed air at approximately 60 p.s.i. primary pressure is fed into the system through line 32. At the panel, this air pressure is reduced to between 10 and 20 p.s.i. at a flow rate of two-tenths to three-tenths cubic feet per hour by manipulating the regulator 34 and needle valves 37 and 40. The pressure setting and flow rate are governed by two factors, namely, (1) the actual location of the probe tubes in tank 15 and the depth of said tank and (2) the stability of the reading obtained in tank 15 and test tank 21. The air flow should be so adjusted that there is very little "oscillation" of the indicating liquid in the indicating column and a smooth and steady climb of the indicating liquid, when the valve assembly is operated to move the valves from one position to another. For different liquids and various depths of the location of the probe tubes in the tank 15 the setting may differ but it is substantially always from .2 to .3 cubic foot per hour of flow rate and from 10 to 20 p.s.i. gauge pressure. Having obtained a zero check, my specific gravity indicator is set for use in testing the specific gravity of a liquid, i.e. by inserting probe tubes 22 and 23 into the liquid to be tested.

The standard liquid 16 in the tank 15 is used to obtain the zero check or setting of the indicating liquid 3. For this purpose, the valve V is operated so that the transmission lines 8 and 12 are connected to the probes 18 and 17, respectively, to raise the indicating liquid 3 to the bottom or left hand end (viewing Fig. 1) of the calibrated scale 5. This should bring the indicating liquid 3 up to the top of the bend in the line 2, to the lower or starting portion of the inclined section 4. In order to assure this condition, the well 1 may be vertically raised or lowered, as required, through the previously described means. The valve is then operated to disconnect the transmission lines 8 and 12 from probes 18 and 17, respectively, and to connect them to probes 23 and 22, respectively, to indicate the specific gravity of the liquid 20 in the tank 21. In measuring the specific gravity of a liquid 20 which is within the range of the calibrated scale 5, the indicating fluid will be raised, above the previously mentioned bend, along the inclined portion 4. As previously described, the indicating liquid will move a greater linear distance up the inclined leg than it would in a vertical indicating leg, with the result that the difference in the specific gravities of the standard or test liquid 16 and the liquid 20 is amplified through the use of the inclined leg portion on the line 2, the hydrostatic pressures of the liquids 16 and 20 being neutralized or equalized by the compressed air applied through line 32. Since the difference in the specific gravities is amplified, the increments on the scale 5 can be of such a separation as to provide a readily legible scale so as to provide an amplified reading of the specific gravity of the unknown liquid 20, which could not be obtained by the calibration of a vertical indicating leg alone.

It will be noted (Figs. 1 and 8) that the inclined portion 4 of the indicating leg 2 has a vertical component which is substantially smaller than the height of the vertical portion. Accordingly most of the indicating liquid in the indicating leg 2 is accommodated by the vertical portion. It is only the upper part of the liquid, that part which indicates the difference in the specific gravity of the standard liquid 16 and the liquid 20, that appears on the inclined portion 4. As previously described, the indicating liquid will move a greater linear distance along the inclined portion 2 than up the vertical portion. Consequently, by accommodating substantially all of the indicating liquid in the vertical portion of indicating leg 2, the length of indicating leg 2 in comparison with an equivalent totally inclined indicating leg is substantially smaller.

The thermometer 44 and memo pointer 45 merely record the temperature at which the setting of the scale took place. If the temperature should vary about 10° from the temperature at which the zero check was originally performed, another zero setting should be made.

It is to be understood that the foregoing detailed description is given merely by way of illustration and that many variations may be made therein without departing from the spirit of my invention.

Having described my invention what I desire to secure by Letters Patent is:

1. In apparatus for measuring the specific gravity of a liquid, the combination of a U-tube pressure gauge including a pressure leg connected to a lower transmission line and an indicating leg connected at its upper end to an upper transmission line, said indicating leg comprising a lower vertical columnar portion and an upper transparent portion inclined to said vertical portion and extending upwardly therefrom and in communication therewith, the vertical component of said inclined portion being substantially less than the height of said lower vertical portion, said indicating leg further being adapted to contain indicating liquid, a tank for holding a standard liquid and containing suspended therein in fixed relation a lower probe tube and an upper probe tube terminating at a fixed height above the lower end of the lower probe tube, said probes determining a first pressure difference representative of the specific gravity of said standard liquid, a measuring probe assembly for insertion into a liquid, the specific gravity of which is to be measured, including in fixed relation a lower probe tube and an upper probe tube terminating at the aforesaid fixed height above the lower end of the lower probe tube, said measuring probes determining a second pressure difference representative of the specific gravity of said liquid, means for simultaneously connecting said lower and upper transmission lines to, respectively, the lower and upper probe tubes in said tank and then, respectively, to the lower and upper probe tubes in said measuring probe assembly for selectively applying said first and second pressures to said gauge, the level of liquid within said indicating leg being responsive to said pressure for indicating the specific gravity of said standard liquid and said liquid whose specific gravity is to be measured, and means for supplying a compressed inert gas at a constant rate to said transmission lines.

2. In apparatus for measuring the specific gravity of a liquid, the combination of a U-tube pressure gauge including a pressure leg connected to a lower transmission line and an indicating leg connected at its upper end to an upper transmission line, said indicating leg comprising a lower vertical columnar portion and an upper transparent portion inclined to said vertical portion and extending upwardly therefrom and in communication therewith, the vertical component of said inclined portion being substantially less than the height of said lower vertical portion, said indicating leg further being adapted to contain indicating liquid, a tank for holding a standard liquid and containing suspended therein in fixed relation a lower probe tube and an upper probe tube terminating at a fixed height above the lower end of the lower probe tube, said probes determining a first pressure difference representative of the specific gravity of said standard liquid, a measuring probe assembly for insertion into a liquid, the specific gravity of which is to be measured, including in fixed relation a lower probe tube and an upper probe tube terminating at the aforesaid fixed height above the lower end of the lower probe tube, said measuring probes determining a second pressure difference representative of the specific gravity of said liquid, dual 3-port, 2-position valve means for simultaneously connecting said lower and upper transmission lines to, respectively, the lower and upper probe tubes in said tank and then, respectively, to the lower and upper probe tubes in said measuring probe assembly for selectively applying said first and second pressures to said gauge, the level of liquid within said indicating leg being responsive to said pressures for indicating the specific gravity of said standard liquid and said liquid whose specific gravity is to be measured, and means for supplying a compressed inert gas at a constant rate to said transmission lines, whereby said inclined portion accommodates only a small portion of said indicating liquid.

3. Apparatus for measuring the specific gravity of a liquid comprising, a U-tube pressure gauge having a pressure leg adapted to contain an indicating liquid and an indicating leg, means adapted to contain a standard liquid and including means for developing a first pressure difference representative of the specific gravity of said standard liquid, means adapted to contain a liquid whose specific gravity is to be measured and including means for developing a second pressure difference representative of the specific gravity of said liquid, means to alternatively subject said gauge to the pressure differences in said containers to provide indications by the indicating liquid in said indicating leg in accordance with the specific gravities of the liquids in said containers, respectively, and means to amplify the difference of said indications in said indicating leg, said indicating leg having a vertical section which communicates at its lower end with said pressure leg, and said difference amplifying means being an inclined section extending from the upper end of said vertical section, the vertical component of said inclined section being substantially less than the height of said vertical section, whereby said inclined portion accommodates only a small portion of said indicating liquid, and means to adjust said pressure gauge so that the indicating liquid will rise substantially to the top of said vertical section when the gauge is subjected to the liquid in the standard liquid container, whereby the indicating liquid will enter said inclined section when the gauge is connected to a liquid in the other container having a specific gravity greater than the specific gravity of the standard liquid.

4. Apparatus for measuring the specific gravity of a liquid comprising, a U-tube pressure gauge having a pressure leg adapted to contain an indicating liquid and an indicating leg connected at its upper transmission line, said indicating leg comprising a lower vertical columnar portion and an upper transparent portion inclined to said vertical portion and extending upwardly therefrom and in communication therewith, the vertical component of said inclined portion being substantially less than the height of said lower vertical portion, said indicating leg further being adapted to contain indicating liquid, means adapted to contain a standard liquid and including means for developing a first pressure difference representative of the specific gravity of said standard liquid, means adapted to contain a liquid whose specific gravity is to be measured and including means for developing a second pressure difference respresentative of the specific gravity of said liquid, means to alternatively subject said gauge to the pressure differences in said containers to provide indications by the indicating liquid in said indicating leg in accordance with the specific gravities of the liquids in said containers, respectively, and means to amplify the difference of said indications in said indicating leg, means to equalize the liquid depths in said containers to which the gauge is subjected, and means to neutralize the hydrostatic pressures to which the gauge is subjected by the liquids in said containers, whereby said inclined portion accommodates only a small portion of said indicating liquid.

5. In apparatus for measuring the specific gravity of a liquid, the combination of a U-tube pressure gauge including a pressure leg, comprising a well connected to a lower transmission line and an indicating leg connected at its upper end to an upper transmission line, said indicating leg comprising a lower vertical columnar portion and an upper transparent portion inclined to said vertical portion and extending upwardly therefrom and in connection therewith, the vertical component of said inclined portion being substantially less than the height of said vertical portion, said indicating leg further being adapted to contain indicating liquid, said well being of greater cross-section area than either of said transmission lines, a tank for holding a standard liquid and containing suspended therein in fixed relation a lower probe tube and an upper probe tube terminating at a fixed height above the lower end of said lower probe tube, said probe tubes determining a first pressure difference representative of the specific gravity of said standard liquid, a measuring probe assembly for insertion into a liquid, the specific gravity of which is to be measured, including in fixed relation a lower probe tube and an upper probe tube terminating at the aforesaid fixed height above the lower end of the lower probe tube, said measuring probe tubes determining a second pressure difference representative of the specific gravity of said liquid, means for simultaneously connecting said lower and upper transmission lines to, respectively, the lower and upper probe tubes in said tank and then, respectively, to the lower and upper probe tubes in said measuring probe assembly for selectively applying said first and second pressures to said gauges, the level of liquid within said indicating leg being responsive to said pressure for indicating the specific gravity of said standard liquid and said liquid whose specific gravity is to be measured, and means for supplying a compressed inert gas at a constant rate to said transmission lines whereby said inclined portion accommodates only a small portion of said indicating liquid, said well being vertically adjustable to extend the indicating range of said apparatus.

References Cited in the file of this patent

UNITED STATES PATENTS

| | | |
|---|---|---|
| 1,500,790 | Bachrach | July 8, 1924 |
| 1,699,812 | Sartakoff | Jan. 22, 1929 |
| 2,577,548 | Vetter | Dec. 4, 1951 |
| 2,613,535 | Born | Oct. 14, 1952 |

FOREIGN PATENTS

| | | |
|---|---|---|
| 45,494 | Austria | Jan. 10, 1911 |